United States Patent
McConnell

[15] 3,664,211
[45] May 23, 1972

[54] VEHICLE DOOR LOCK RELEASE METHOD AND APPARATUS

[72] Inventor: John S. McConnell, 6242 Longmont, Houston, Tex. 77027

[22] Filed: Oct. 15, 1970

[21] Appl. No.: 80,832

[52] U.S. Cl. ............................................................81/3 R
[51] Int. Cl. ....................................................E05b 19/20
[58] Field of Search..................81/3 R; 29/278; 70/465, 394, 70/340; 24/205

[56] References Cited

UNITED STATES PATENTS 2,027,009   1/1939   Wyscaver..................................81/3 R Primary Examiner—Robert C. Riordon
Assistant Examiner—Roscoe V. Parker, Jr.
Attorney—Paul E. Harris, Lee R. Larkin and Marcus L. Thompson

[57] ABSTRACT

An elongate member arranged for downward insertion into a vehicle door between the door glass and window sill and arranged to engage a portion of the door lock assembly and trip the lock. Means are provided for exerting either an upward or a downward force upon a lock release arm of the lock assembly.

4 Claims, 6 Drawing Figures

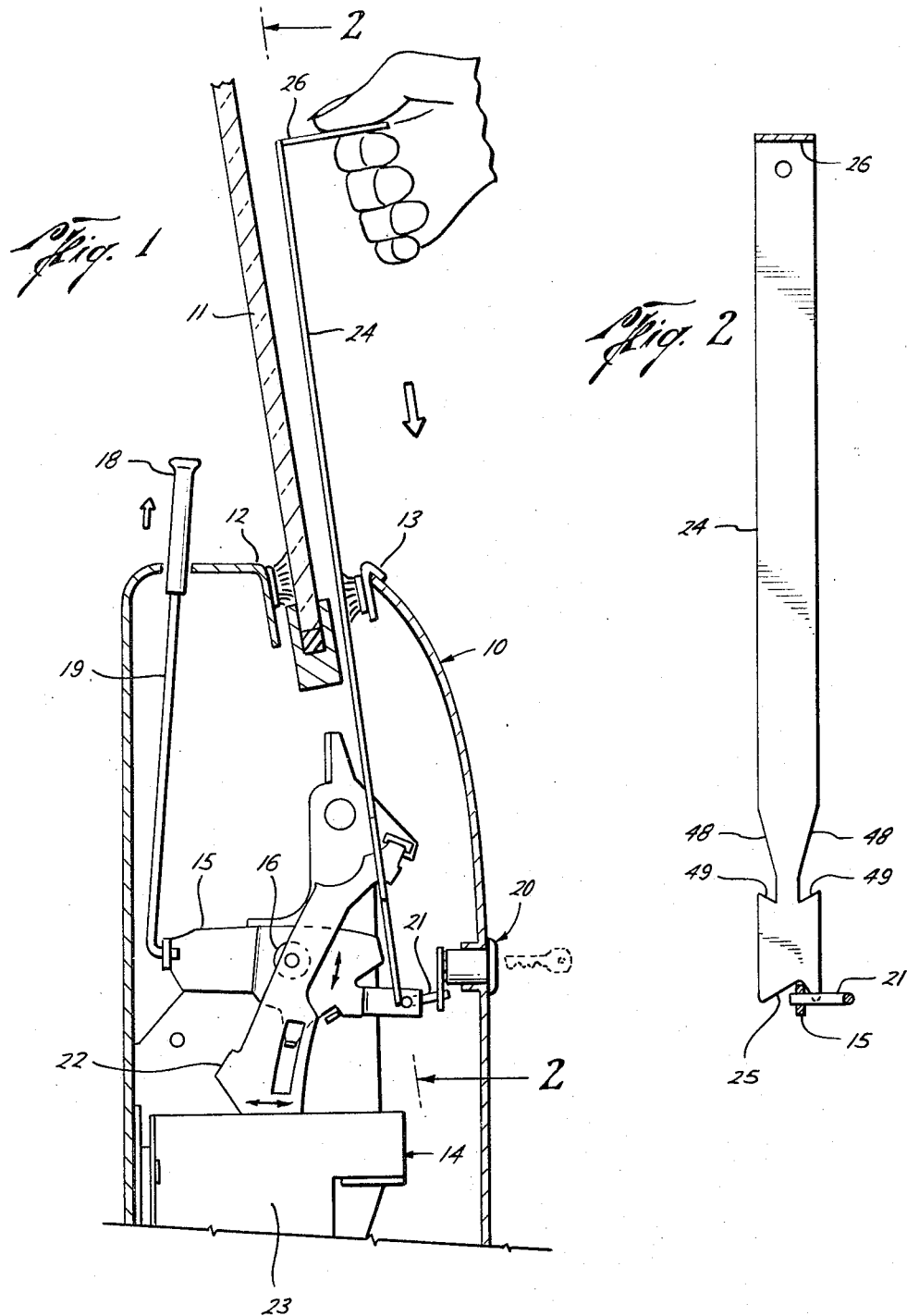

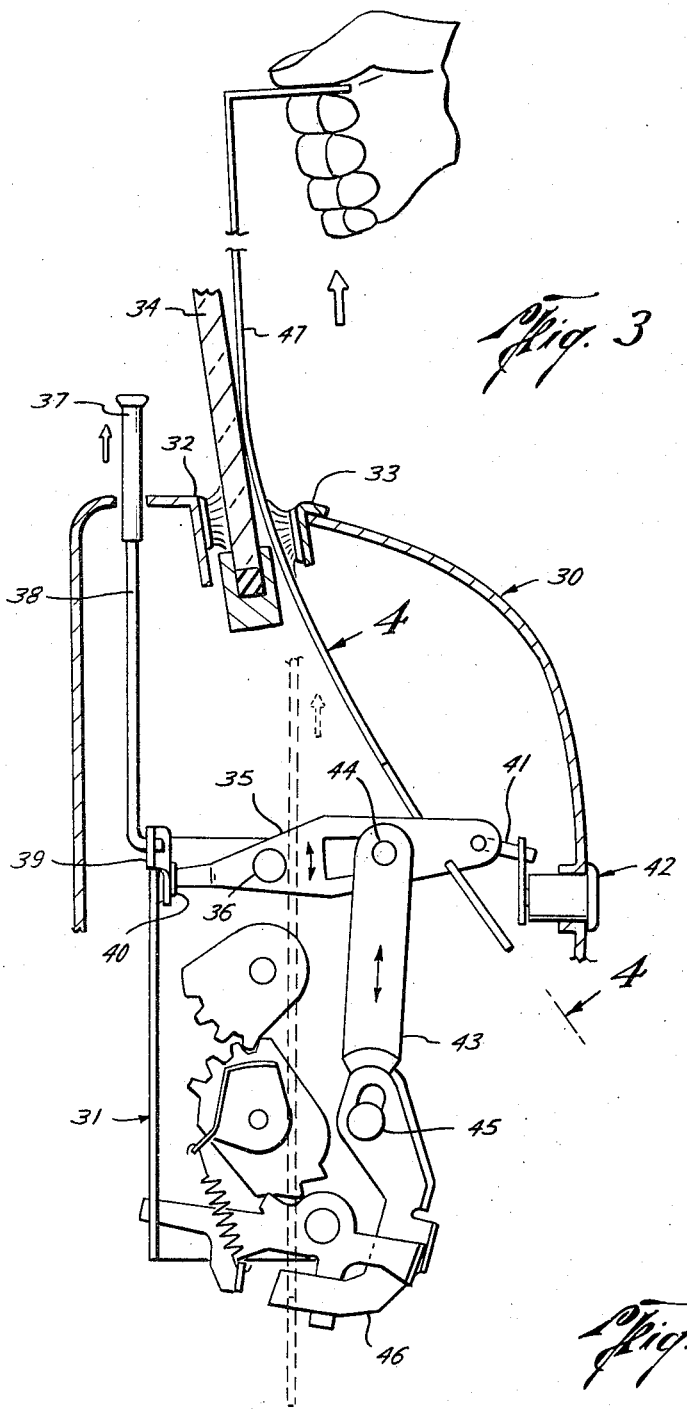

3,664,211

VEHICLE DOOR LOCK RELEASE METHOD AND APPARATUS

BACKGROUND OF THE INVENTION

1. Field of the Invention

A vehicle door lock release tool and a method for releasing vehicle door locks.

2. Description of the Prior Art

Many instances currently arise where it is necessary to gain access to a locked automobile, truck or other vehicle without the use of a door key. For example, Police departments are continually required to remove illegally parked vehicles that are locked. This requires access to the interior of the vehicle so that the emergency brake and/or the transmission may be released and the steering wheel blocked. Store owners, parking lot supervisors, new car dealers, used car dealers, hotels, motels, service stations and auto repair shops similarly are called upon regularly to open automobiles when keys have been locked in the automobile or have been misplaced.

If a locksmith is not available to pick the lock through the key tumbler assembly, the current practice for opening the door involves the insertion of a tool into the vehicle around the window glass. The tool is manuvered around in an attempt to engage the door handle or lock buttons to open the door from within the vehicle. A differently shaped tool is usually required for each make and model of vehicle. Typical prior art devices proposed for use in this method are shown in U.S. Pat. Nos. 2,885,917 and 2,334,696.

Even when a tool of the necessary configuration is available, the procedure can be fairly time consuming and costly, and may result in damage to the window and/or weather stripping. In several makes and models, no tool can be inserted around a window without damaging the vehicle.

The instant invention has as an object an apparatus and method for opening a large variety of vehicle doors from outside the vehicle without a key and without penetrating into the interior of the vehicle.

SUMMARY OF THE INVENTION

The apparatus of this invention is designed to release a vehicle door lock of the type having a movable lock release arm, and includes an elongate member having one end arranged for downward insertion into a vehicle door between the window glass and the window sill. The lower end of the member includes means for engaging a release arm of the lock and for transmitting a lock releasing force thereto. The member is preferably a flat strip of material and the end thereof to be inserted into the door is arranged to transmit either an upward or a downward force to the release arm, depending on the type of lock to be released.

The method of releasing a vehicle door lock of the type having a movable release arm includes the steps of sliding an elongate member downward into a vehicle door between the door sill and the window glass, engaging a movable lock release arm with the lower end of the member, and transmitting a lock release force to the arm. Either an upward or a downward force may be transmitted to the lower or upper portion, respectively, of the release arm, depending on the type of lock.

BRIEF DESCRIPTION OF THE DRAWING

FIG. 1 is a partial section view of a vehicle door and lock assembly showing one embodiment of the lock release tool apparatus of this invention inserted therein.

FIG. 2 is a partial section view of the tool and lock shown in FIG. 1 and is taken along 2—2 of FIG. 1.

FIG. 3 is a partial sectional view of a vehicle door similar to FIG. 1 but showing a different door configuration and a different type of lock assembly.

FIG. 4 is a partial sectional view of the tool and lock shown in FIG. 3 and is taken along 4—4 of FIG. 3.

FIG. 5 is a partial side elevation view of an alternate embodiment tool apparatus of this invention.

FIG. 6 is an edge view taken along 6—6 of FIG. 5.

DESCRIPTION OF THE PREFERRED EMBODIMENT

Referring to the drawings, a partial cross-sectional view of an automobile door 10 is shown in FIG. 1. A window glass 11 extends upwardly between an inside window sill portion 12 and an outside window sill portion 13 of the door.

Transversely mounted within door 10 is a typical first type of door latch assembly 14 which includes a generally horizontal lock actuation and release arm 15 arranged for pivotal movement about pin 16 in the direction shown by the arrows. The left end of arm 15 is connected to the inside lock knob 18 by rod 19, and the right end of arm 15 is connected to an outside tumbler assembly 20 by rod 21. In this type of door latch mechanism, rotation of a key in tumbler 20 or vertical movement of know 18 will cause limited rotation of arm 15 about pin 16. Arm 15 is connected through lock bar 22 to the remainder of the lock mechanism in latch compartment 23, and the overall lock assembly is arranged so that counter clockwise movement of arm 15 will prevent actuation of the door latch. Inserted downwardly between window 11 and outside window sill 13 is a first embodiment of the lock release tool 24 of this invention, the lower end of which is contacting the top right end of arm 15. A downward force on tool 24 will rotate arm 15 in a clockwise direction, unlatching door latch assembly 14 so that the door may be opened using the inside or outside door handles (not shown) in the conventional manner. The engagement between release tool 24 and arm 15 may be more clearly seen in FIG. 2.

The tool is formed of a flat strip of material, such as spring steel, and has a notch 25 formed in the lower end to aid in positioning and retaining the end of tool 24 on arm 15. No particular type of material or tool shape is required, as long as the tool is of sufficient strength and shape to be inserted as shown and capable of transmitting a release force to arm 15. If desired, tool 24 may be provided with a handle portion 26 extending outwardly from the upper end thereof.

Referring now to FIG. 3, a second type of typical vehicle door 30 and door latch assembly 31 is shown in partial cross-section. Extending upward out of door 30 between inside window sill 32 and outside window sill 33 is a door glass 34. Door latch assembly 31 is transversely positioned within door 30 and includes a generally horizontal lock actuation and release arm 35 pivotally mounted on pin 36 and arranged for limited rotational movement about pin 36. The left end of arm 35 is connected to inside lock knob 37 through rod 38 and arm 39 pivoted on pin 40. Downward movement of knob 37 will cause an upward movement of the left end portion of arm 35 and a downward movement of the right end portion of arm 35. The extreme right end of arm 35 is connected through rod 41 to a conventional key tumbler assembly 42 which opens on the outside surface of door 30.

A locking or unlocking force transmitted to arm 35 from either knob 37 or tumbler 42 is transmitted downward to the remainder of lock assembly 31 through trigger arm 43, which arm is pivotally connected to arm 35 by pin 44. Arm 43 is arranged for restrained vertical travel about slide pin 45. Therefore, downward (locking) movement of knob 37 or a locking force from tumbler 42 causes a downward movement of arm 43, including downward movement of the lower portion 46 thereof.

A lock release tool 47, suitable for use with this type of door latch mechanism, is shown in FIG. 3 inserted into door 30 between window 34 and outside window sill 33. The lower portion of tool 47 is shown deflected toward the outside of door 30 and is contacting the right end of arm 35.

As shown in FIGS. 3 and 4, release tool 47 is formed from a generally flat strip of material and is provided with notches 48 on either side of the lower end thereof. The lower edge 49 of notches 48 presents surfaces which are generally transverse to tool 47, either of which may be used to engage the generally lower portion of the right end of arm 35, as shown. An upward force on tool 47 is transmitted through one of notches 48 and transverse surfaces 49 to the lower side of arm 35, causing upward movement thereof, thereby unlocking latch assembly 31.

The vehicle door then may be opened in the conventional manner. The inside and outside door handles on door 30 and the linkages connecting them to latch assembly 31 are omitted from the drawings for simplification.

When tool 47 is to be used in the manner shown in solid lines in FIG. 3, it is preferable to construct tool 47 of a flexible strip of material which has the property of retaining a curved deformation normal to the surface thereof, as shown in FIG. 3. This deformation may then be made in tool 47 before insertion thereof into door 30.

In this type of latch assembly, tool 47 alternatively may be inserted into door 30 in the position shown in broken lines in FIG. 3. The transverse portion 49 of one of notches 48 is then positioned under the lower portion 46 of arm 43. An upward force on tool 47 will force arm 43 and the right portion of arm 35 upward, unlocking latch assembly 31 as described above. For this type of use, tool 47 may be constructed of any suitable strip material and the material need not be capable of remaining in a curved or deformed condition.

As shown in FIGS. 2 and 4, a tool 23 may be constructed having a notched lower end 25 and also having side notches 48, so that either of the typical latch assemblies shown in FIGS. 1 and 3 may be unlocked with the same tool.

Referring to FIGS. 5 and 6, an alternate embodiment tool 50 is shown which similarly may be used for exerting either an upwards or a downwards force on a vehicle door latch release arm. In this embodiment tool 50 is provided with a notch 51 on one end for transmitting downward unlocking forces, as described above. Instead of having side notches for transmitting upward unlocking forces, however, tool 50 is provided with a generally transverse arm portion 52 extending from the side thereof. Arm 52 may be formed from the same piece of material as the body of tool 50 or may be a separate piece of strip or rod material attached thereto, as shown. Arm 52 may extend transversely from the edge of tool 50 at the end having notch 51 or may be positioned at the end opposite from notch 51, as shown. A tool 50 having an arm 52 is particularly useful in unlocking the door locks on vehicles that have a portion of the latch mechanism which extends over the top of the latch release arm (not shown) which extended portion prevents direct access to the latch release arm from above. Arm 52 may be used to exert either an upwards or a downwards force on a latch release arm or on a trigger arm such as 43 in FIG. 3, or an extension thereof such as 46 in FIG. 3.

The method of this invention may be performed using any of the release tools described above, or equivalents thereof. In the method an elongate tool member is inserted between the door glass and the outside window sill in the area of the door latch mechanism. The tool is directed downward into engagement with a lock release arm of the latch mechanism and is then moved to transmit a lock release force to the lock release arm. Depending on the type of vehicle and latch mechanism, the tool may be engaged on either the upper or lower surface portion of a lock release arm and the respective release force may be either downwards or upwards. After a short period of practice on various types of vehicles, the proper engagment between the tool and the release arm can be achieved in minimal time with little or no "fishing" required.

Further modifications may be made in the apparatus and method of this invention in view of the foregoing description.

What is claimed is:

1. In a method of releasing a vehicle door lock, the combination of steps comprising:
    sliding an elongate member downward into a vehicle door between the door sill and the window glass;
    engaging a movable lock release arm of the door lock mechanism of said door with a lower end portion of said member; and,
    transmitting a lock release force to said arm through said member.

2. The invention as claimed in claim 1 wherein:
    said engaging step includes engaging the generally top portion of said arm; and,
    said transmitting step includes transmitting a generally downward force to said arm.

3. The invention as claimed in claim 1 wherein:
    said engaging step includes engaging the generally bottom portion of said arm; and,
    said transmitting step includes transmitting a generally upward force to said arm.

4. A vehicle door lock release tool for a lock having a movable lock release arm, comprising:
    an elongate flat member having one end arranged for downward insertion into a vehicle door between the window glass and window sill;
    said one end of said member terminating in a transverse edge and having a generally downwardly pointing notch formed therein arranged to engage the generally upper portion of a lock release arm so that a downward force may be exerted on said arm; and,
    a side portion of said member inwardly spaced from said one end having at least one notch formed therein, said notch opening away from said transverse edge to engage the bottom edge of said arm as said tool is drawn upwardly through said door in contact with said arm, so that a generally upward force may be exerted on said arm.

* * * * *